Jan. 31, 1961
H. I. KRELLEN
2,969,868
CONVERTIBLE SWITCH AND LOAD TRANSFERER
FOR OVERLAND CONVEYOR SYSTEM
Filed Aug. 15, 1958
4 Sheets-Sheet 1
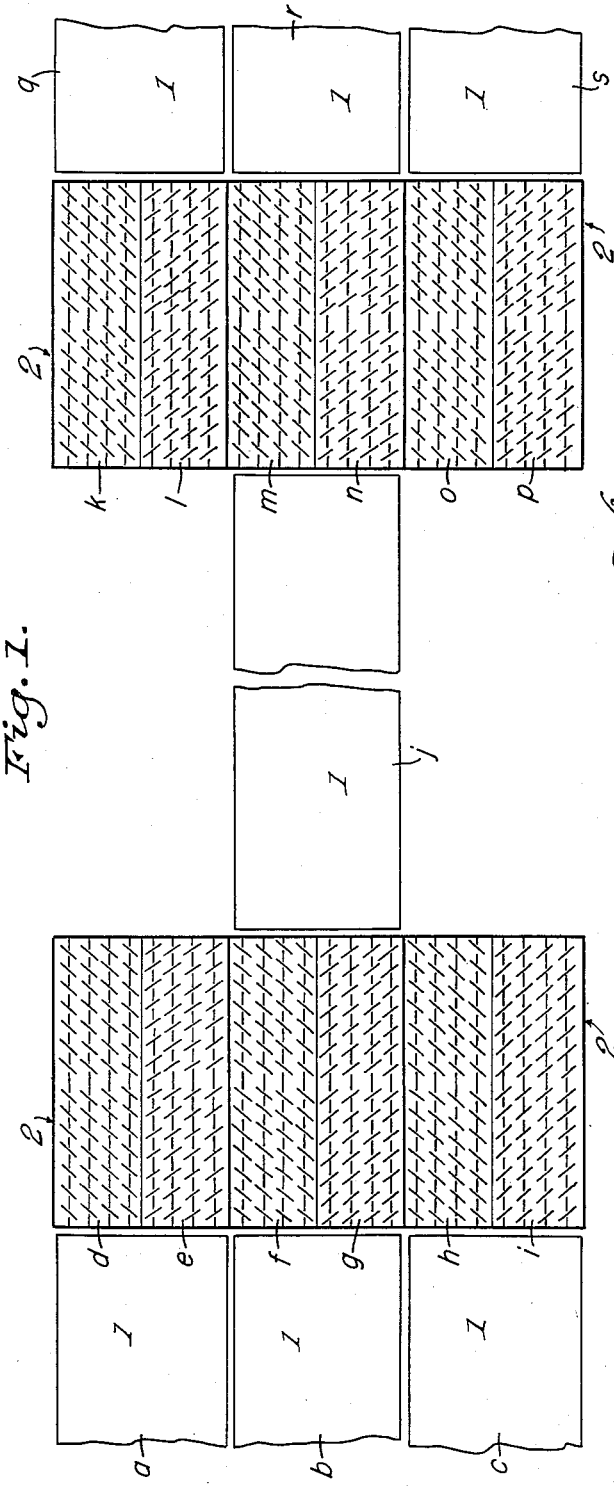
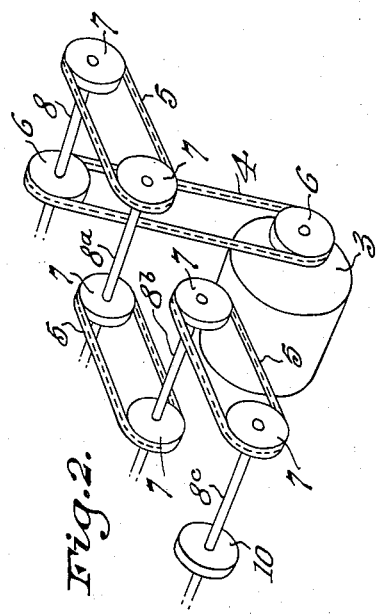
INVENTOR.
Harry I. Krellen
BY
ATTORNEYS

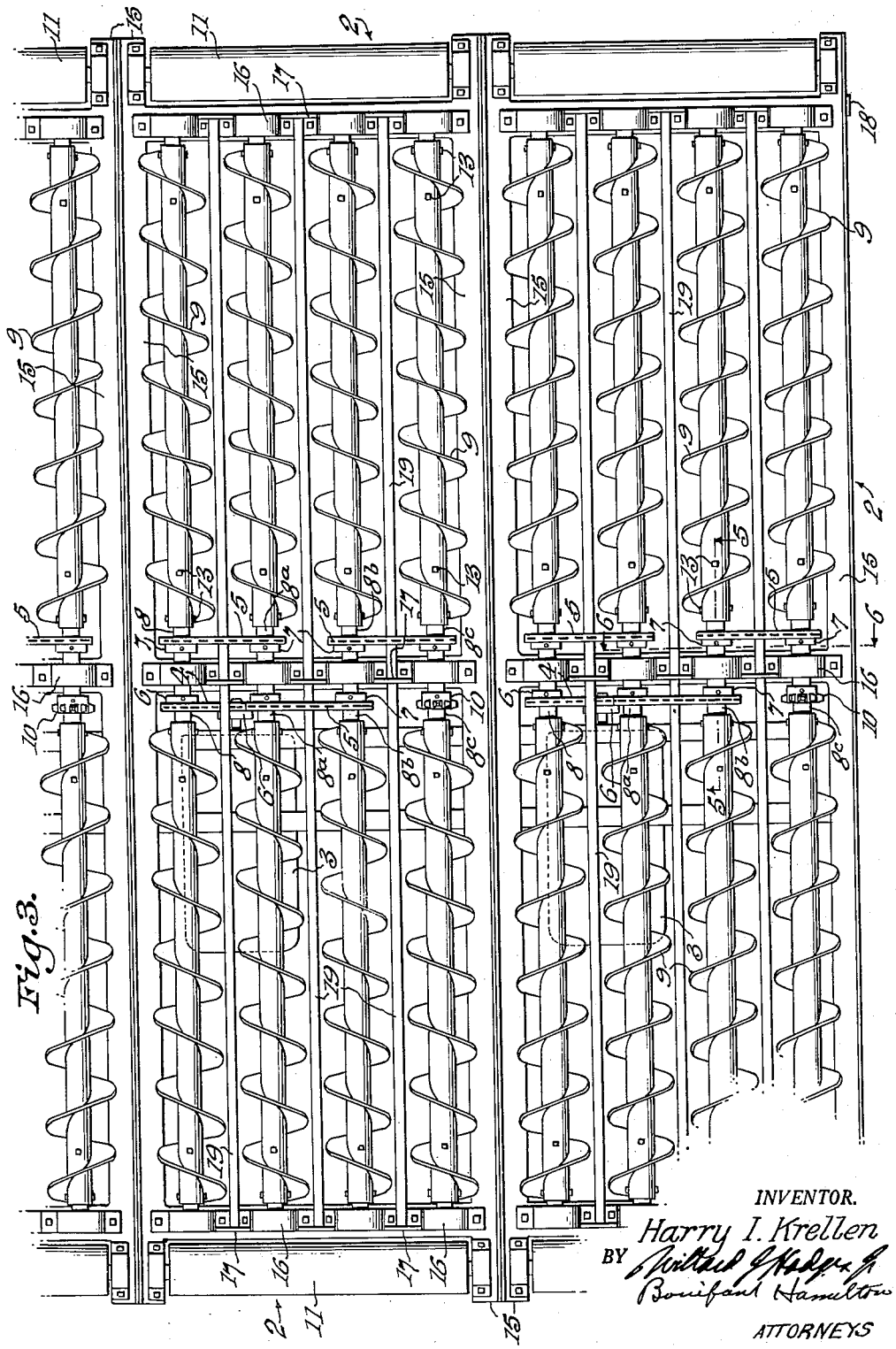

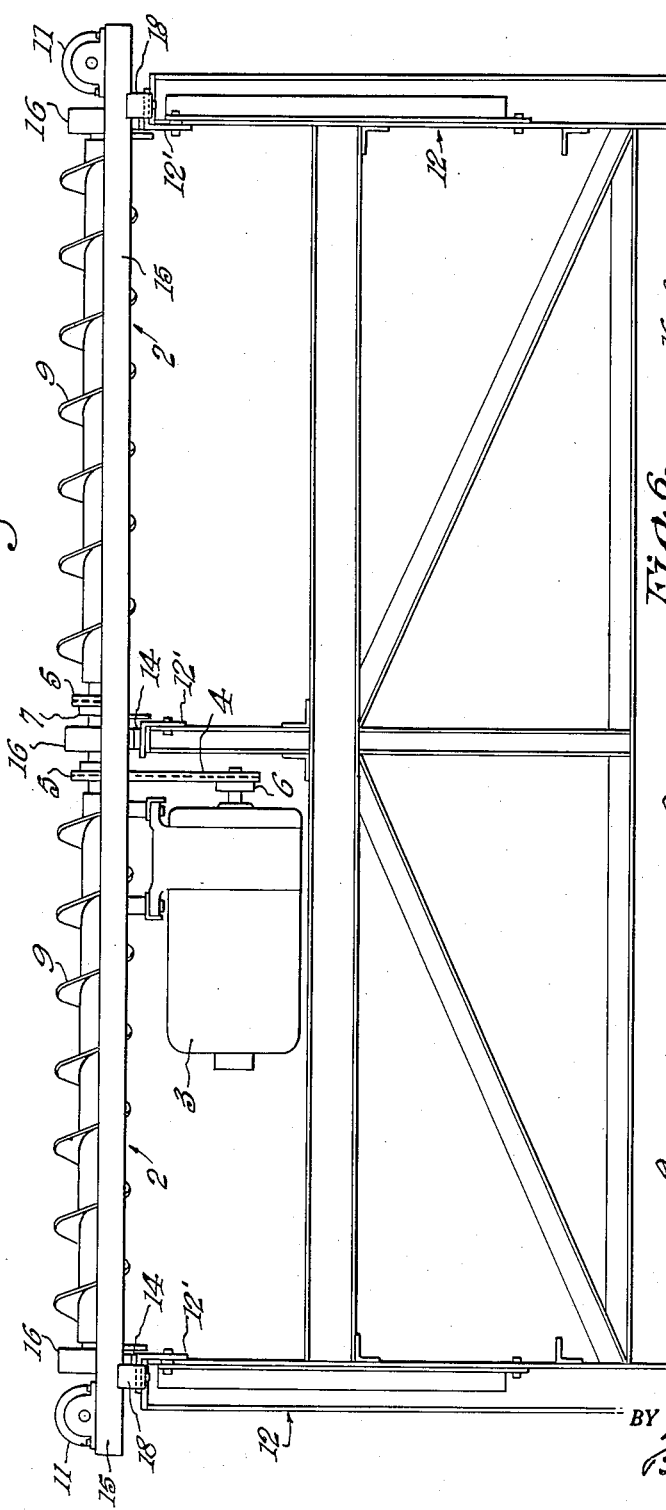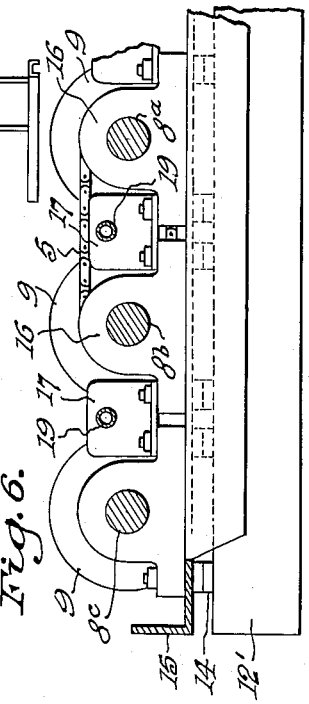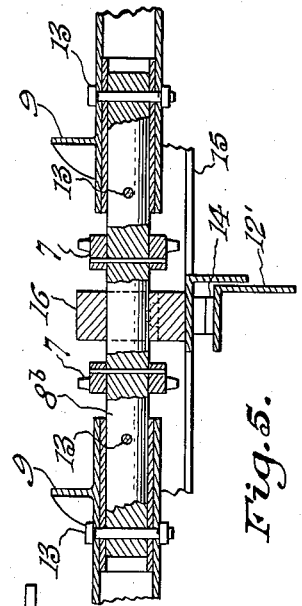

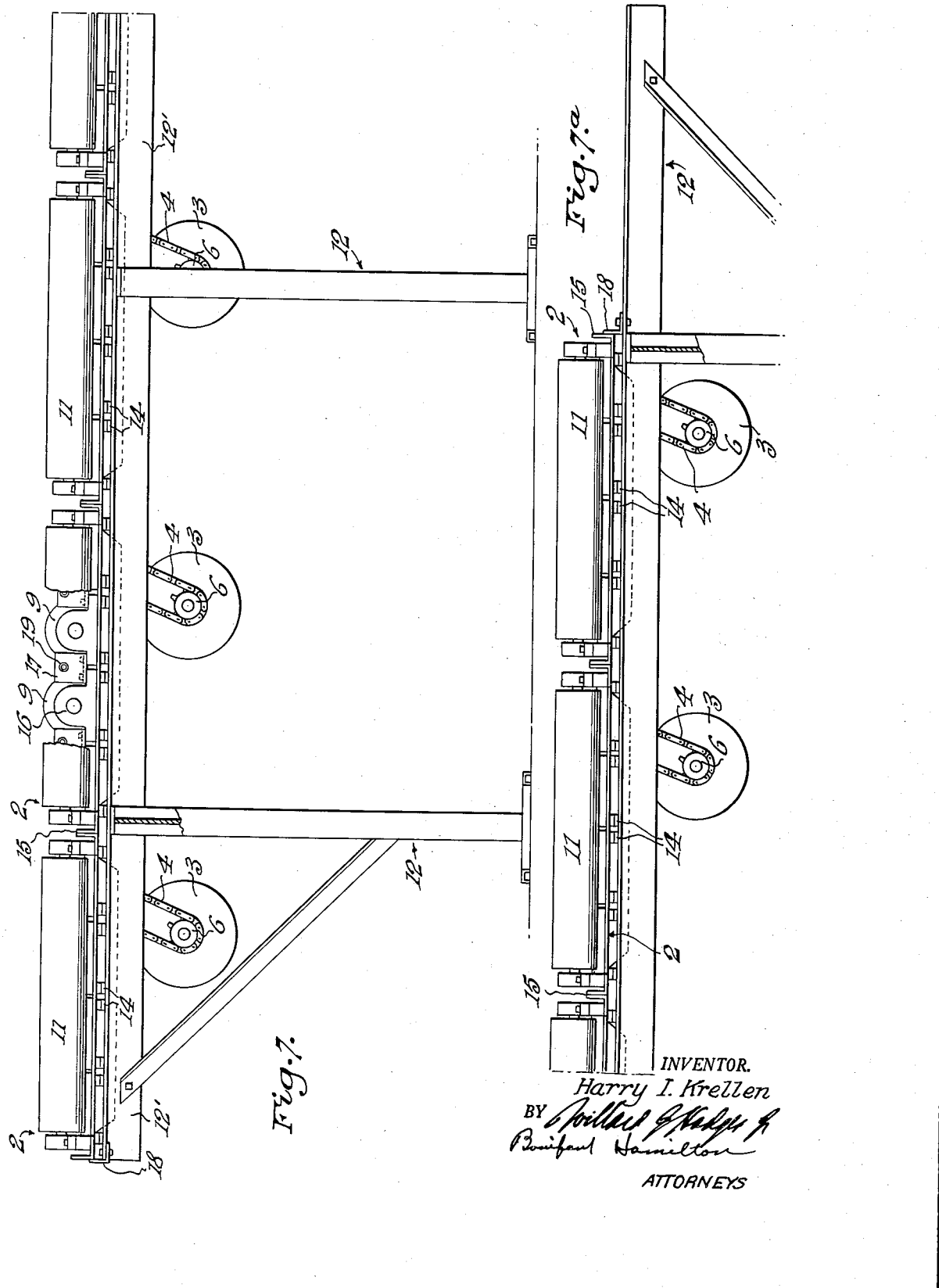

United States Patent Office 2,969,868
Patented Jan. 31, 1961

2,969,868

CONVERTIBLE SWITCH AND LOAD TRANSFERER FOR OVERLAND CONVEYOR SYSTEM

Harry I. Krellen, Newport News, Va., assignor to the United States of America as represented by the Secretary of the Army Filed Aug. 15, 1958, Ser. No. 755,363

10 Claims. (Cl. 198—78)

(Granted under Title 35, U.S. Code (1952), sec. 266)

The invention described herein may be manufactured and used by or for the Government for governmental purposes without the payment of any royalty.

This invention relates to a conveyor system and particularly to a conveyor system having a plurality of feeder conveyors.

The invention relates to a system wherein a plurality of feeders may discharge onto a receiver conveyor or switch which can be selectively controlled to allow feeding from any selected one of several conveyors at one end of the system to a single conveyor or to any selected one of several conveyors at the opposite end of the system. The invention comprises the use of a cargo switch including a plurality of screw conveyor units, to be herein described, which normally constitute package centering devices when operating. By using a plurality of these units, switching of a load from one conveyor branch to another can be effected. The system provides for either collecting cargo from several branch lines to a center main line and/or dispersing cargo from the main line to several branch lines.

Pallets and packages are presently transferred from one conveyor to another by means of a conveyor switch having a movable head operated in much the same manner as a railroad switch. This method of switching cargo is not in consonance with the speed of the main line conveyor. Accordingly, a bottle neck is created in the system because of the time required to shift the head from one position to another. The present invention through the use of the helicoid screw units, to be herein described in greater detail, does away with this slower system.

It is an object of this invention to provide a rapid method of transferring pallets or packaged cargo from one branch of a conveyor to another branch of a conveyor by use of a cargo switch device utilizing helicoid conveyor screws.

It is another object of this invention to provide for reversal of load flow in a main line conveyor system with an efficient method of switching the load to any desired branch line.

It is a further object of this invention to provide efficient means for conveying the load flow from a plurality of conveyors into a single line conveyor, and further convey the load flow to any desired branch line.

The foregoing objects and advantages of the present invention, together with various other objects and advantages thereof which will become apparent, may be attained with the embodiment of the invention illustrated in the accompanying drawings and described in detail hereinafter. Referring to the drawings:

Fig. 1 is a diagrammatic plan view of the conveyor system;

Fig. 2 is a diagrammatic perspective view of the drive for one of the load transfer units;

Fig. 3 is a top plan view of several of the load transfer units;

Fig. 4 is a side elevation of one of the load transfer units;

Fig. 5 is an enlarged detailed vertical sectional view taken on line 5—5 of Fig. 3;

Fig. 6 is an enlarged vertical sectional view taken on line 6—6 of Fig. 3; and

Fig. 7 and Fig. 7a are end views of the conveyor system.

Referring with more particularity to the drawings, Fig. 1 shows the overall plan view using a main conveyor line and three auxiliary lines feeding into said main line and three lines branching off at the opposite end. All the conveyor lines are designated as 1. The load transfer switch comprises a plurality of units designated as 2 and in Fig. 1, six complete units are used. Looking at Fig. 3, each unit 2 comprises two sections of four helicoid screws 9. Each screw 9 is segmented and is mounted by means of bearings 16 at each end and in the middle. Each section of four screws is driven by a motor 3. Fig. 2 shows the drive system wherein the motor 3 connects to a load transfer drive shaft 8 by means of a main load transfer drive chain 4 and main load transfer drive sprockets 6. In turn the three other drive shafts 8a, 8b, 8c are interconnected by means of sprocket wheels 7 and drive chains 5, as shown. The sprocket 10 is a spare for connecting another screw, if desired, to the drive means. It can be seen from Fig. 2 that each section of four screws 9 will rotate in the same direction at any one time. Each drive unit is controlled by a two-way electrical switch (not shown) which permits reversal of rotation of the motor and the screws driven thereby. At the ends of each unit of four screws are transverse rollers 11 for easy roll-on and roll-off of the pallets and packages to be transported. Looking at Fig. 5 it is seen that the shaft carrying the spiral vane of screw 9 is hollow to permit shaft 8 to interconnect the segments and to seat the screw 9 in bearing 16. Drive shaft 8 is connected to screw 9 by means of a pair of bolts 13. Between each screw (Fig. 6) is a bracket 17 at the ends thereof which connects the bearing housings 16. A support rod 19 fits into bracket 17 and runs the length of the transfer unit fitting into the opening of a bracket 17 at the other end. Each section 2 has an angle iron frame 15 which in turn rests upon the top rails support 12¹ of the main frame 12. Between frame 15 and support 12¹ are rubber cushions 14, while brackets 18 at each corner of the load transfer unit prevent lateral movement. It is apparent that removal of a whole unit or one screw is accomplished with a minimum of difficulty.

The operation of a conveyor system using the load transfer units described in combination with an arrangement of a main conveyor and branch conveyors is simplicity itself. The novelty lies in the ability of this combination to transfer loads quickly and with a minimum of equipment with the use of a plurality of the load transfer units as shown in one preferred combination in Fig. 1. These units are arranged in side-by-side relationship, the number of units being equal to twice the number of feed-on or feed-off lines desired to connect to a single main conveyor. As can be seen from Fig. 3 each unit 2 comprises a pair of sections disposed in end-to-end relationship, each unit includes four conveyor screw elements 9, disposed in mutually parallel relationship. Each unit has its own motive power as has been pointed out. The motor for each unit is separately electrically controlled to provide rotation in a clockwise or counterclockwise direction depending upon the particular load transfer scheme to be accomplished. Since the manner of connecting the motors to accomplish this result is well known to those skilled in the electrical arts and since the particular type of motive power to be employed is a matter of choice and independent of the novelty of the instant invention, no details of the motor control circuits have been described herein. When the unit operates as a combined conveying and centering device, the screws in each unit all turn in the same direction but the screws in adjacent units turn in respectively opposite directions so that the top surfaces of the screws in each of the adjacent units move towards the other unit. This action centers a package or receptacle relative to the two switch units associated with a particular conveyor and the screws urge the package or receptacle along the device from the receiving end to the discharge end. A particular feature of novelty of the present arrangement is that the screw conveyor units can perform as article centering and shifting units as well as load transfer units. To explain this operation the three feed-on conveyors shown in Fig. 1 have been designated as $a$, $b$, and $c$, the six units of the associated switch device as $d$, $e$, $f$, $g$, $h$, and $i$, the main line conveyor as $j$, the switch device units at the discharge end of the main line conveyor as $k$, $l$, $m$, $n$, $o$, and $p$, and the three discharge or off-loading conveyors as $q$, $r$, and $s$.

Assuming now that the cargo movement is from conveyor $b$ to conveyor $j$, only units $f$ and $g$ of the cargo switch device are energized and the screws of unit $f$ turn in a counterclockwise, and the screws of unit $g$ in a clockwise direction, as viewed in Fig. 6. Under these conditions cargo items will be moved from conveyor $b$ longitudinally of the switch device to conveyor $j$.

If it is desired to move cargo items from conveyor $a$ to conveyor $j$, switch units $d$, $e$, $f$, and $g$ will be energized. The screws of units $d$ and $f$ will be constantly turned in a counterclockwise direction, as viewed in Fig. 6, and the screws of unit $g$ will be constantly turned in a clockwise direction. The screws of unit $e$ will turn in a clockwise direction while a cargo item is being moved from conveyor $a$ onto switch units $d$ and $e$. When the cargo item has been moved onto the switch device, the direction of rotation of screws of unit $e$ is reversed so that the screws of units $d$, $e$, and $f$ all turn in the same (counterclockwise) direction. This moves the cargo item from the units $d$ and $e$ onto the units $f$ and $g$. As the screws of unit $g$ are still turning in the originally clockwise direction, the item will be centered on the units $f$ and $g$ and moved from these units onto the conveyor $j$. The rotational direction of the screws of switch unit $e$ must be reversed and subsequently returned to the original direction of rotation for each cargo item moved from conveyor $a$, if it is desired to transfer cargo items from conveyor $a$ to conveyor $j$.

If it is desired to move cargo items from conveyor $c$ to conveyor $j$, switch units $f$, $g$, $h$, and $i$ will be energized. The screws of units $g$ and $i$ will constantly turn in the clockwise direction, as viewed in Fig. 6, and the screws of unit $f$ will constantly turn in the counterclockwise direction. The screws of unit $h$ will turn in the counterclockwise direction to move a cargo item from the conveyor $c$ onto units $h$ and $i$ of the switch device and will be reversed and turned in the clockwise direction to move the cargo item from the switch units $h$ and $i$ onto the switch units $f$ and $g$ by which the item is moved onto the conveyor $j$.

At the discharge end of the conveyor system, cargo units can be transferred from the main-line conveyor $j$ selectively to the discharge conveyors $q$, $r$, and $s$ by energizing and reversing the switch units $k$, $l$, $m$, $n$, $o$, and $p$ in the same manner as described above for the switch units $d$, $e$, $f$, $g$, $h$, and $i$.

From this description it can be seen that a load can be quickly transferred from any feeder conveyor to the main line conveyor by selecting the rotational direction of the load transfer units between the feeder conveyor and the main line conveyor. Similarly, the load can be transferred at the discharge end via the same process of selection. It is obvious that the process may be reversed making the discharge end the feeding end and vice versa.

I claim:
1. A conveyor system comprising a main conveyor, a plurality of feeder conveyors and a plurality of helicoid screw units disposed in side-by-side alignment interconnecting said main and feeder conveyors, each of said feeder conveyors being terminated by a pair of helicoid screw units, one of said pair of units communicating with said main conveyor, each of said plurality of helicoid screw units including a plurality of uni-directionally revolving helicoidal screws and reversible drive means therefor.

2. A conveyor system comprising a plurality of feeder conveyors, a plurality of receiver conveyors and a main conveyor interconnecting said feeder and receiver conveyors, a first transfer assembly disposed between said feeder conveyors and said main conveyor and a second transfer assembly disposed between said receiver conveyors and said main conveyor, said first and second transfer assemblies each including a plurality of parallelly arranged helicoid screw units, one of said units of said first transfer assembly communicating with said main conveyor and one of said units of said second transfer assembly communicating with said main conveyor, each of said units including a pair of sections in side by side relationship, each of said sections having a plurality of unidirectionally revolving screws and reversible drive means for each of said sections whereby cargo may be transferred selectively between said feeder conveyors and said receiver conveyors over said main conveyor.

3. A conveyor system as claimed in claim 2 wherein the helicoid screw units comprise two longitudinally disposed symmetrical sections, each of said sections having a plurality of unidirectionally revolving screws, said sections terminating at opposite ends thereof in a transverse roller, and wherein the reversible drive means comprises motors connected by sprocket and chain means to the meeting ends of each section of screws intermediately of said transverse rollers, said sections bolted on an angle iron frame removably connected through resilient mountings upon a stand.

4. In a conveyor system including a main conveyor and a plurality of feeder conveyors cooperating with said main conveyor to transport cargo therebetween, a transfer assembly interconnecting the feeder conveyors and said main conveyor comprising a plurality of parallelly arranged units, each of said feeder conveyors being terminated by one of said plurality of units and one of said plurality of units communicating with said main conveyor, each of said units including pairs of longitudinally disposed frames symmetrically arranged in a common horizontal plane, each of said frames having mounted thereon for unidirectional rotational movement a plurality of parallel, longitudinally disposed elements, each of said elements comprising a hollow tube having a vane spirally secured thereto forming together with said hollow tube a helical screw, one end of each of said elements including drive means for imparting rotational movement to said element, interconnecting means rigidly joining adjacent ends of the hollow tubes of said helical screws for unidirectional rotation of the helical screws mounted on each of said pairs of longitudinally disposed frames, the helical screws of the longitudinally disposed pairs of frames rotating in the same direction, roller means at the ends of each of said frames opposite said interconnecting means and transversely disposed relative to the helical screws on said frame and cooperating therewith to move cargo onto said screws and driving means connected to said interconnecting means joining the helical screws of each of said pairs of longitudinally disposed frames for rotating said helical screws unidirectionally for selectively moving cargo between said feeder conveyors and said main conveyor.

5. In a conveyor system including elongated conveyors arranged in end-to-end relationship and in side-by-side coterminous relationship, a cargo switch device disposed between opposed ends of elongated conveyors for selectively shifting cargo between said elongated conveyors, said cargo switch device comprising a supporting frame, a plurality of switch units supported in side-by-side relationship in said frame with one pair of switch units in alignment with each conveyor, each switch unit comprising a unit frame, a plurality of screw shafts journalled in said frame in parallel relationship to each other, and drive means effective to turn all the screw shafts in the same conveyor unit in the same direction, the screw shafts in each two adjacent units being threaded in opposite directions and normally driven in respectively opposite directions to center cargo items on the pair of adjacent switch units and move the cargo items from one end to the opposite end of the cargo switch device, the drive means for at least some of said units being reversible to move cargo items across said switch device transversely of said switch units.

6. In a conveyor system including elongated conveyors disposed in side-by-side, coterminous relationship and in spaced apart end-to-end relationship, a cargo switch device disposed between ends of conveyors arranged in spaced apart end-to-end relationship and comprising a supporting frame, and a plurality of switch units mounted in side-by-side relationship in said frame and disposed to align a pair of switch units with each of said conveyors, each of said switch units comprising a unit frame, a plurality of screw shafts journalled in said unit frame in side-by-side relationship, and selectively operative drive means effective to turn all of the screw shafts in the same switch unit in the same rotational direction.

7. A cargo switch device for a conveyor system including elongated conveyors arranged in side-by-side coterminous relationship and in spaced apart end-to-end relationship, said switch device comprising a supporting frame of rectangular shape and a plurality of switch units supported in side-by-side relationship in said frame with a pair of adjacent units extending longitudinally from each of the associated conveyors, each of said switch units comprising a unit frame, a plurality of screw shafts journalled in side-by-side relationship in said unit frame, and drive means connected to said screw shafts and effective to drive all the screw shafts in the same switch unit in the same rotational direction.

8. A cargo switch device for a conveyor system including elongated conveyors arranged in side-by-side coterminous relationship and in spaced apart end-to-end relationship, said switch device comprising a supporting frame of rectangular shape and a plurality of switch units supported in side-by-side relationship by said frame with a pair of adjacent units adapted to extend longitudinally from each of the associated conveyors, each of said switch units comprising a unit frame, a plurality of screw shafts journalled in side-by-side relationship in said unit frame, and drive means connected to said screw shafts effective to drive all of the screw shafts in the same switch unit in the same rotational direction, the screw shafts in adjacent switch units being oppositely threaded and driven in respectively opposite directions so that the top surfaces of the screw shafts in each of a pair of adjacent switch units associated with the same conveyor move toward the other unit of the same pair to center cargo items on the pair of switch units and move the items toward or away from the adjacent end of the associated conveyor.

9. A cargo switch device for a conveyor system including elongated conveyors arranged in side-by-side coterminous relationship and in spaced apart end-to-end relationship, said switch device comprising a supporting frame of rectangular shape and a plurality of switch units extending longitudinally from each of the associated conveyors, each of said switch units comprising a unit frame, a plurality of screw shafts journalled in side-by-side relationship in said unit frame, and drive means connected to said screw shafts and effective to drive all the screw shafts in the same switch unit in the same rotational direction, the screw shafts in adjacent switch units being oppositely threaded and normally driven in respectively opposite directions so that the top surfaces of the screw shafts in each of a pair of adjacent switch units associated with the same conveyor move toward the other unit of the same pair to center cargo items on the pair of switch units and move the items toward or away from the adjacent end of the associated conveyor, at least some of said drive means being selectively reversible to turn the screw shafts in a series of side-by-side switch units in the same rotational direction for moving cargo items across said switch device transversely of said switch units.

10. A cargo switch device comprising a supporting frame and a plurality of switch units mounted in side-by-side relationship in said frame and extending from one end to the other end of the frame, each of said switch units comprising a unit frame and a number of screw shafts, at least two of said screw shafts journalled in said unit frame in side-by-side relationship, and power means connected to said screw shafts effective to drive all of the screw shafts in the same switch unit in the same rotational direction.

References Cited in the file of this patent

UNITED STATES PATENTS

| | | |
|---|---|---|
| 1,826,853 | Williams | Oct. 13, 1931 |
| 2,797,792 | Burke | July 2, 1957 |